United States Patent [19]

Grossman et al.

[11] 4,319,838
[45] Mar. 16, 1982

[54] VEHICLE WHEEL ALIGNMENT APPARATUS

[75] Inventors: James M. Grossman, Chesterfield; Daniel B. January, Bel-Ridge, both of Mo.

[73] Assignee: Hunter Engineering Company, Bridgeton, Mo.

[21] Appl. No.: 80,274

[22] Filed: Oct. 1, 1979

[51] Int. Cl.³ .......................... G01B 11/26; G01B 5/24
[52] U.S. Cl. ...................................... 356/152; 33/288; 356/155
[58] Field of Search ................... 356/152, 155; 33/288

[56] References Cited

U.S. PATENT DOCUMENTS

| | | | |
|---|---|---|---|
| 3,181,248 | 5/1965 | Manlove | 33/203.18 |
| 3,533,699 | 10/1970 | Hopkins et al. | 356/152 |
| 3,719,424 | 3/1973 | Weischedel | 356/141 |
| 3,865,492 | 2/1975 | Butler | 356/155 |
| 4,095,902 | 6/1978 | Florer et al. | 356/155 |
| 4,097,157 | 6/1978 | Lill | 356/152 |
| 4,126,943 | 11/1978 | Senften | 356/155 |
| 4,138,825 | 2/1979 | Pelta | 33/288 |
| 4,180,326 | 12/1979 | Chang | 356/155 |

Primary Examiner—S. C. Buczinski
Attorney, Agent, or Firm—Gravely, Lieder & Woodruff

[57] ABSTRACT

Apparatus for determining the alignment characteristics of vehicle wheels in which electronic signal generators are coupled to each of the vehicle wheels and is so arranged that wheel position signals are produced in terms of angular relationship to a line of sight from another wheel of the vehicle, and are fed into a computer where calculations are performed to develop results related to a known reference axis of the vehicle and capable of being displayed. The preferred apparatus employs transducers in which signals substantially free of surrounding noise are easily produced and of such as to be readily processed for display.

3 Claims, 11 Drawing Figures

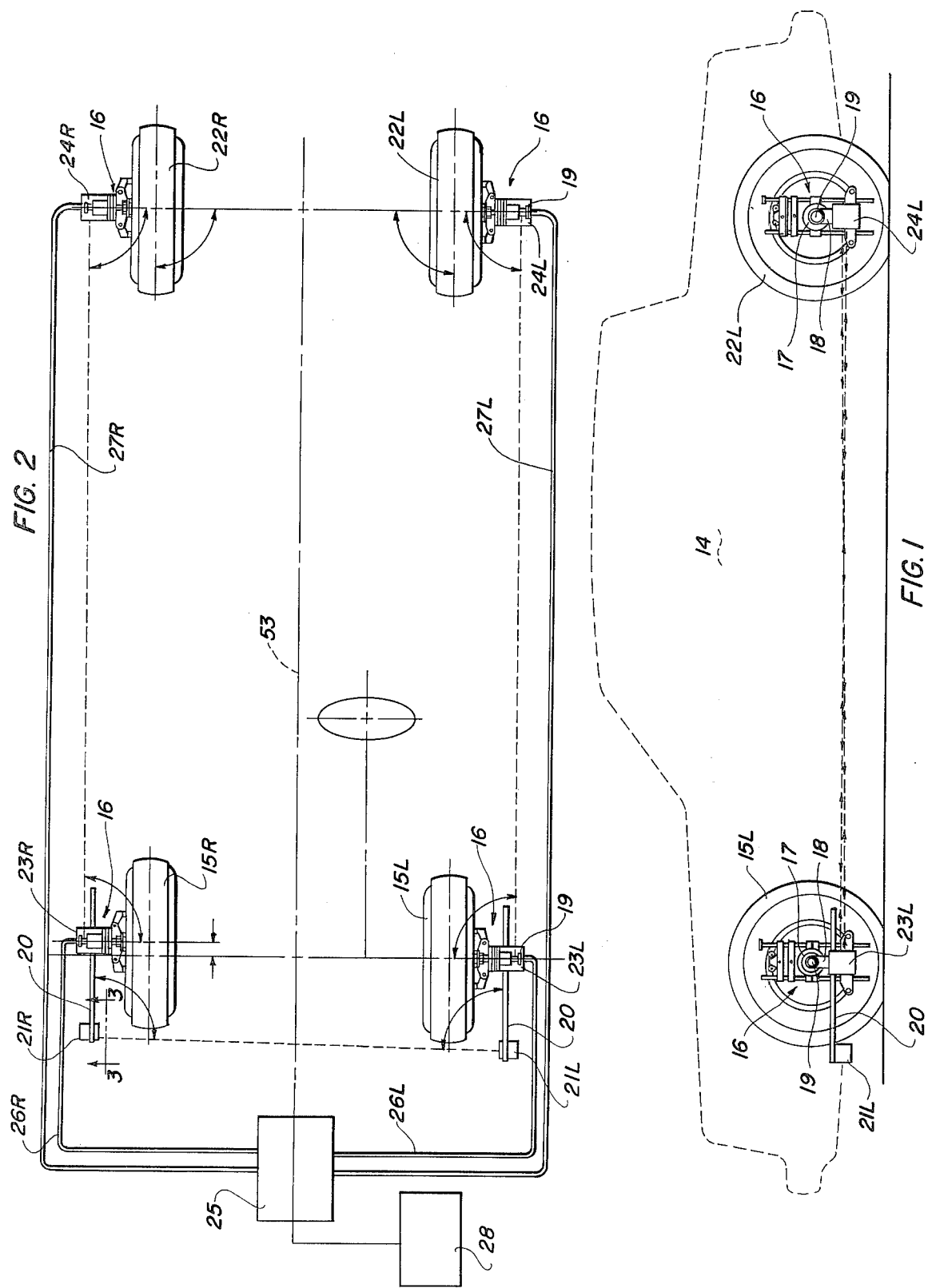

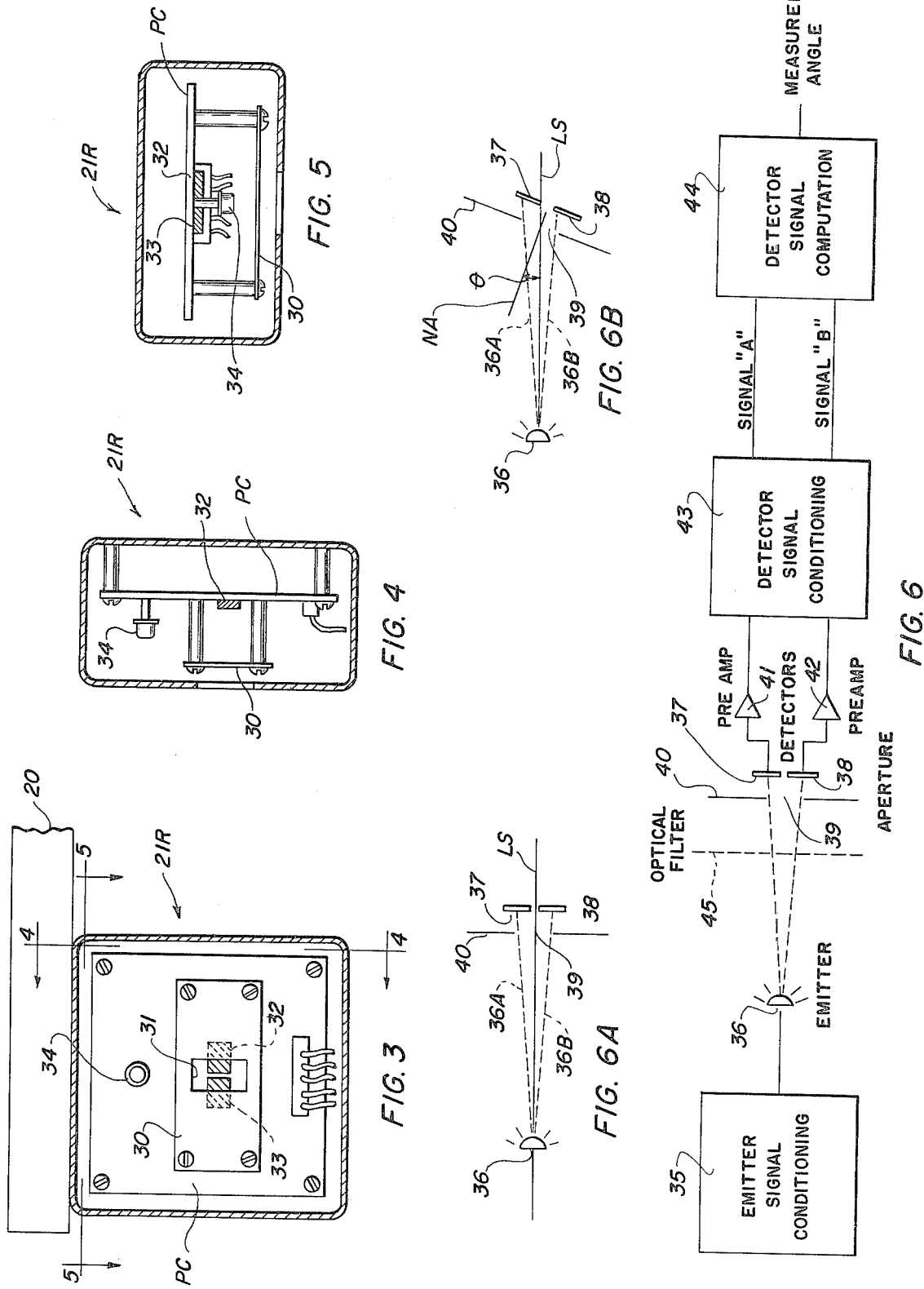

VEHICLE WHEEL ALIGNMENT APPARATUS

BACKGROUND OF THE INVENTION

The state of the art relative to vehicle wheel alignment determination has been moving more and more toward electro-mechanical and electro-optical apparatus. The move in that direction has been in most cases motivated by the increasing cost of purely mechanical devices and the need to put operators through sufficient schooling to perform the necessary steps in the use of such apparatus for a reliable result. An example of mechanical apparatus applied to all vehicle wheels has been disclosed by Manlove in U.S. Pat. No. 3,181,248 of May 4, 1965. In this disclosure the apparatus has been arranged for measuring the alignment of the vehicle steerable and non-steerable wheels in which mechanical interconnections, both transversely and longitudinally, are required. Without exhausting examples of prior art, a following generation of wheel aligning apparatus of some pertinence has been set forth by Butler in U.S. Pat. No. 3,865,492 of Feb. 11, 1975. Here the apparatus applied only to the steerable wheels used light projectors and photo-electric receivers mounted in pairs behind a shade so that signals are generated to indicate the angular position of impingment of the light beam.

A further arrangement for determining vehicle wheel alignment using light projectors and mirrors is disclosed by Florer et al in U.S. Pat. No. 4,095,902 of June 20, 1978. The disclosed apparatus combined electronic computing circuits for determining the wheel angles, but the information depended upon the use of mirrors which have known shortcomings. A somewhat similar arrangement of apparatus has been disclosed by Lill in U.S. Pat. No. 4,097,157 of June 27, 1978. More comprehensive alignment apparatus can be found in the copending application of Hollandsworth et al, Ser. Nos. 967,072 filed Dec. 6, 1978 and 023,403 filed Mar. 23, 1979.

BRIEF SUMMARY OF THE INVENTION

This invention pertains to vehicle wheel alignment apparatus, and more particularly to an all electronic arrangement of apparatus applicable to use with all vehicle wheels.

A principal object of this invention is to be able to find the important alignment positions of the wheels of a vehicle so that the findings can be displayed or otherwise can be made known so corrections where indicated can be undertaken.

Other important objects of this invention are to provide apparatus having essentially all electronic components to reduce cost, avoid factory adjustments, eliminate optical elements, minimize sensitivity to ambient noise, improve the manufacturing methods without sacrificing reliability, and to obtain greater accuracy of results where the instruments need to function at distances which vary from the tread widths and wheel base lengths encountered in the size spectrum of the vehicles in use.

In accordance with the present invention the apparatus comprises support means to be coupled to the individual wheels, first instruments carried by the support means coupled to the steerable wheels in positions to be in line-of-sight with each other across the vehicle, second instruments carried by the support means coupled to the steerable wheels adjacent the axis of steerable wheel rotation, third instruments carried by the support means coupled to the non-steerable wheels adjacent the axis of non-steerable wheel rotation and in positions such that second and third instruments are in line-of-sight with each other longitudinally of the vehicle, and means interconnecting the first, second and third instruments with calculating means for processing signals generated thereby in respect of wheel position relative to a known longitudinal reference on the vehicle.

In a more specific presentation of the invention the apparatus is made up of a source of radiant energy projected along a path toward a pair of spaced radiant energy detectors spaced from the source of radiant energy, the projected radiant energy and the detectors being on different spaced vehicle wheels, beam control means associated with the pair of spaced detectors for controlling the presentation of the radiant energy to the spaced detectors such that the detectors generate signals related to the angular position of the detectors relative to the path of the radiant energy, and means connected to the detectors for calculating the value of the angular position in terms of vehicle wheel alignment position relative to the vehicle reference axis.

BRIEF DESCRIPTION OF THE DRAWINGS

The present invention is illustrated in the accompanying drawing in a manner to set forth a preferred embodiment of instruments and components making up the apparatus, and wherein:

FIG. 1 is a side elevational view of a passenger vehicle taken from the left side to show the body silhouette and some detail relating to the placement of the instruments to be seen in greater detail;

FIG. 2 is a schematic plan view of the vehicle wheels equipped with instruments for carrying out the objectives of the invention;

FIG. 3 is a fragmentary front view on an enlarged scale of typical electro-optic transducer components seen along line 3—3 in FIG. 2, the view being schematic to illustrate the organization of components without particular regard to the details of the housing;

FIG. 4 is a further view of the transducer components as seen from the side along line 4—4 in FIG. 3;

FIG. 5 is still another view of the transducer components as seen from the top along line 5—5 in FIG. 3;

FIG. 6 is a block diagram of the electronic circuitry for the present invention in which one typical emitter-detector transducer combination has been revealed in association with signal computation means;

FIGS. 6A and 6B are diagrams of the transducer components and their effects on the optical path of the radiant energy beam;

DETAILED DESCRIPTION OF THE EMBODIMENT

Instrumentation Arrangement

Figure 7:
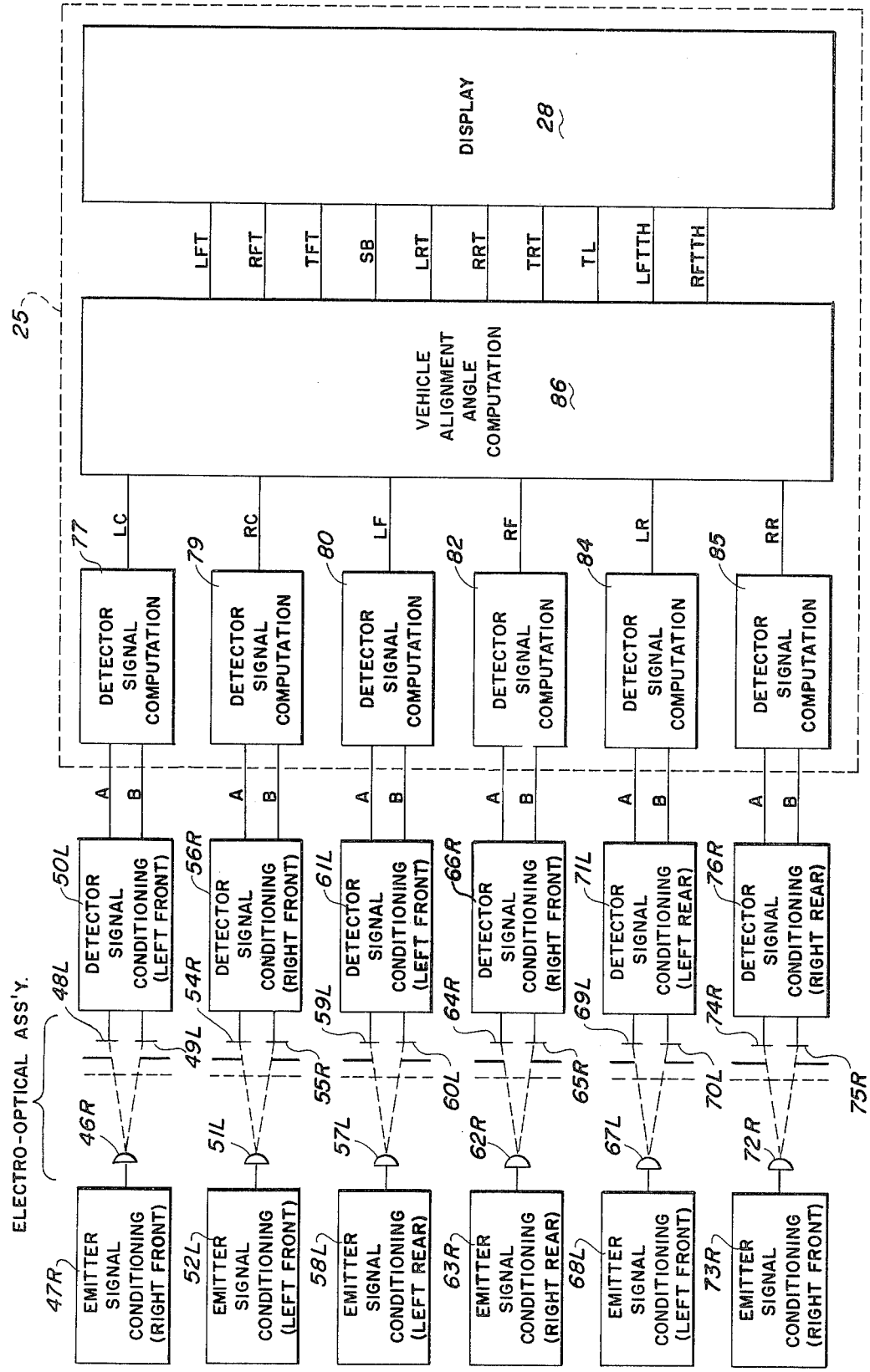
FIG. 7 is a block diagram of the transducers embodied in the vehicle alignment apparatus together with the computer for receiving angle information and the display of the results of the computer computation.

Reference will now be directed to the drawings for a more complete understanding of the intent and scope of the invention presented in terms of an embodiment presently preferred. The view of FIG. 1 is of a passenger vehicle 14 which will serve to illustrate the invention. As seen from the left side, the left steerable wheel 15L is shown in association with an instrument support 16 adapted to grip the flange of the wheel rim. The support 16 carries a pivotal housing 17 the axis of which is substantially centerable to the spindle axis (not shown) on which the wheel 15L rotates. A bracket 18 is hung from the housing 17 so it may assume a vertical position even though the wheel 15L is jacked up so it may rotate. At times, with the wheel 15L resting on its support, it may be desirable to secure the bracket 18 against pendulus movement by tightening up on a knob 19 (FIG. 2). The bracket 18, in addition to the housing 17, carries a support arm 20 which extends forwardly of the housing 18 so it clears the tread of wheel 15L to be in position at its end portion for supporting an instrument device 21L. The support arm 20, or some associated part of the assembly, is usually provided with a spirit level for purposes of locating the arm in a substantially horizontal position, which position is retained by tightening up on the knob 19.

FIG. 1 shows the vehicle non-steerable wheel 22L to be provided with an instrument support 16 which is identical to the support attached to the steerable wheel 15L. The several parts are designated by similar reference numerals and need not be described again. It is particularly important to observe that the support 16 at the left steerable wheel 15L carries an instrument device 23L and the support 16 for the left non-steerable wheel 22L carries a companion device 24L. These devices 23L and 24L are made up of transducer components which are intended to cooperate with each other in a manner to be described presently.

FIG. 2 shows a schematic plan view of all vehicle wheels, such as those at the left side, and companion right side wheels 15R and 22R. The wheels at the left side are distinguished by adding the suffix "L", and those at the right side are distinguished by the suffix "R". However, each wheel 15R and 22R is provided with an instrument support 16 of the construction generally described above. Also, the support 16 on steerable wheel 15R has a support arm 20 which carries an instrument device 21R to cooperate with the left side device 21L. In addition, the support 16 at the non-steerable wheel 22R carries an instrument device 24R to cooperate with an instrument device 23R carried by the support 16 at the steerable wheel 15R. These devices 21L and 21R, as well as devices 23R and 24R, are made up of transducer components and interact cooperatively in a manner to be described.

In the view of FIG. 2, the transducer instruments 21L and 23L are operatively connected into a console assembly 25 by a lead 26L, and the transducer instruments 21R and 23R are similarly connected by a lead 26R to the console 25. In like manner the transducer instruments 24L and 24R are connected respectively by leads 27L and 27R into console 25. Signal processing and alignment computation are performed in the console 25 and the results can be displayed by means shown collectively at 28.

The Transducers

Turning now to FIGS. 3, 4 and 5, there has been shown in some diagrammatic detail a typical transducer instrument, such as the one designated at 21R in FIG. 2. It is to be understood that all of the transducer instruments 21L, 23L, 24L and 21R, 23R and 24R are substantially the same. Thus, the instrument 21R has a panel 30 formed with an aperture 31 used to control the radiant energy beam. The aperture 31 may be produced photographically as a transparent area in an opaque material 30, or the aperture may be an opening in a sheet of solid material. At a suitable distance behind the aperture 31 there are mounted a pair of photodiodes 32 and 33. The width of the aperture 31 is substantially equal to the width of the face of either one of these photodiodes, and it is centered so that, in a null position with radiant energy impinging at 90° to the plane of face 30, the exposure of each photodiode to the radiant energy should be substantially equal. The photodiodes are carried by a printed circuit board PC which also carries preamplifiers for converting the photodiodes output current into voltage, and the operative electronic components associated with radiant energy emitter means 34 which illuminate a cooperative transducer instrument attached to an adjacent wheel. The photodiodes 32 and 33 are illuminated by the radiant energy emitter means of that cooperative transducer instrument.

FIG. 6 is a schematic block diagram of a typical electronic transducer instrument composed of signal conditioning means 35 connected to an emitter 36. The radiant energy beam generated by the emitter 36 is directed at detector means in another instrument spaced therefrom where such other instrument has a pair of detectors 37 and 38 located behind a window 39 in an opaque mask 40. The detectors may be photodiodes having preamplifier means 41 and 42 for converting the current generated in the photodiodes into voltage. These voltage signals are processed in conditioning means 43 to produce output signal A from detector means 41 and output signal B from detector means 42, which serves the purpose of electronically filtering the detector amplifier signals to isolate the emitter signals and eliminates interference due to noise and ambient light. The filters are matched to the characteristics of the emitter signals, which may be square wave or sine wave at audio frequency (10 KHz for example) so that the detector signals are conditioned by bandpass filters whose center frequency matches the emitter signal. In order to obtain angular information the detector signals from the preamplifiers 41 and 42 and means 43 must be processed in separate circuits (or in time shared circuit means) in signal computer means 44 so as to be able to produce results which can be displayed. When optical filter means 45 is employed it is positioned over the aperture 39 and is selected to have transmission characteristics which maximizes passage of the emitter output and minimizes all other light.

Reference will now be directed to FIGS. 6A and 6B to present a full description of the interaction of the component parts of the transducer. The boundary of the portion of the radiant energy beam falling through aperture 39 is shown by the dashed lines 36A and 36B. The center of the beam is denoted by the line of sight LS. In FIG. 6A the line of sight LS is coincident with the normal axis of the aperture 39. This is the null position in which equal amounts of energy fall on detectors 37 and 38. In FIG. 6B the detector and aperture assembly, and hence the normal axis NA, is rotated from the line of sight LS. As seen in the drawing, the effect of the aperture 39 is to bound the energy beam such that more light now falls on detector 37 than detector 38. The electronic current flowing in each detector is proportional to the amount of light incident upon it. The detector signal conditioning means 43 of FIG. 6 must measure these currents and convert them to a DC voltage suitable for signal computation.

The measured angle $\theta$ is that angle bounded by the normal axis NA and line of sight LS. The angle is derived by the computing means 44 in FIG. 6 according to the relationship:

$$\theta = K_G \arctan\left[\frac{A-B}{A+B}\right] - K_O$$

where
$\theta$ = the measured angle
A = conditioned signal from one photodiode
B = conditioned signal from the other photodiode
$K_G$ = gain or range adjust constant
$K_O$ = zero adjust constant In the foregoing disclosure of transducer means the detectors are PN or PIN photodiodes having a large active area which reacts to radiant energy incident on the surface to cause a current flow out of it, if the load impedance is relatively low, or a voltage to develop across it, if the load impedance is relatively high. Preamplifier circuits are constructed such that the preamplifier output signal voltage is linearly proportional to the incident beam intensity. The detector diodes can be used without lenses but can be used with optical filter for suppression of ambient noise. The photodiodes most desired are those sensitive to the near infrared (IR) spectrum. The preferred emitter is an IR emitting LED (IRED). Detection of low level signals in the presence of high ambient noise is most easily achieved with the use of pulsed emitters and matched-filter detectors. It is within this disclosure to employ lasers, laser diodes, and other radiant energy sources. Multiple emitters can be used to achieve higher levels of radiant energy, provided they are mounted to appear as a point source within the expected range of separation of the emitters and detectors. For satisfactory results the transducer must produce "clean" signals which are signals not altered by ambient light or other effects, but signals responsive to "pure" emitter signals. Separation of the emitter signal (or substantially pure emitter signals) from all other (ambient) signals can be accomplished by pulsing the emitter (square wave or other) and filtering the preamplifier outputs with a filter matched to the frequency spectrum of the emitter signal. For example, if the emitter is driven with a 10 KHz square wave and the detector signal is filtered with a 10 KHz narrow bandpass filter, the signal is a sinewave output proportional to the incident radiant energy intensity on the detector which originates at the emitter. Mechanical aid can be added by covering the units to eliminate ambient light, covering the detectors with an IR transmitting filter, or restricting the field of view. The use of detectors at all wheels avoids the inherent loss of signal strength when mirrors are employed, and the effect of light scattering off of adjacent objects or the supporting means 16 can be substantially eliminated or more easily controlled.

Instrumentation Characteristics

Figure 8:
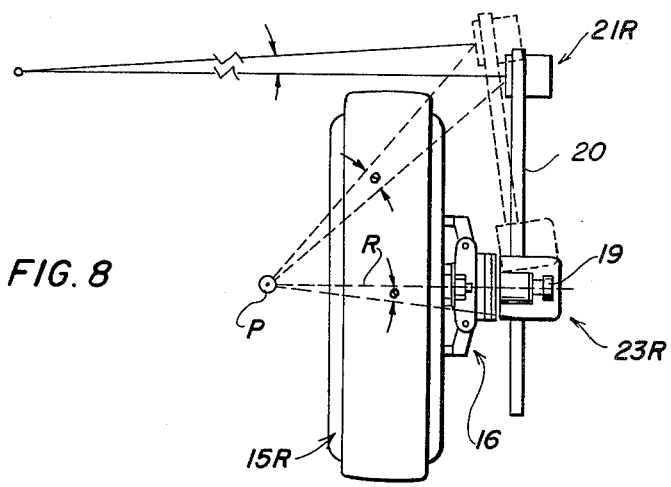
FIG. 8 is an illustration on an enlarged scale of the effect the steerable wheel movement has on the associated transducers for responding to transverse and longitudinal alignment responses.

FIG. 8 illustrates certain characteristics of the instrumentation in relation to its association with a steerable vehicle wheel such as the right wheel 15R. In this view, the support 16, attached to the wheel, positions instrument 21R so that its printed circuit board PC (FIG. 3) is in a plane that is parallel with the rotational plane of the wheel, assuming that it has been compensated for run-out. The instrument 23R is also supported in like manner so that it is not disturbed upon wheel rotation. If the wheel 15R is turned at some angle $\theta$ relative to the center line 53 (FIGS. 2 or 9), whether it is the geometric center line or the vehicle body center line, it will follow that the support 16 will move the instrument 21R forward and to the left so that, relative to the radiant energy beam from the emitter 51L on the left wheel 15L, the detectors 54R and 55R in instrument 21R (see FIG. 7) will have moved closer to that emitter 51L and have formed an angle $\theta$ with a right angular relationship if the wheel 15R were not turned at all. The translational motion of the detectors 54R and 55R relative to the emitter 51L changes the intensity of the received radiant energy, which is of little concern, and introduces an offset in the line-of-sight path to the emitter 51L, which introduces an error term in the computation of the angular motion which is sufficiently small that it can be ignored for present purposes.

Considering the effect of turning wheel 15R on the instrument 23R (FIGS. 7 and 8), the motion of the wheel moves the instrument farther away from the emitter 62R at the wheel 22R. This merely reduces the strength of the beam energy and is not important. Also, the turn of the wheel 15R swings the detectors 64R and 65R in instrument 23R on an arc which has a slight shift to the left. That shift introduces an error of such small magnitude over a wheel base of 100 inches or more that it can be ignored. Thus, the advantage of locating the instrument 23R at the axis of wheel rotation and on a radius, as measured from the pivot axis P for the wheel 15R, is quite evident. The turning of the wheel 15R either in or out changes the received emitter beam strength, and its effect on the signals developed at the detectors 64R and 65R in instrument 23R is in the nature of negligible error.

Transducer Application To Multi-Wheel Vehicle Alignment

While FIG. 6 presented a typical transducer assembly, the instrumentation for the vehicle of FIG. 2 is shown in block diagram in FIG. 7, and reference will be directed to that view. Beginning with the right steerable wheel 15R, there is an emitter 46R connected to its signal conditioning means 47R and directing its radiant energy beam at photodiode detectors 48L and 49L. These detectors generate signal current which is converted to voltage at the signal conditioning means 50L. The detectors and means 50L are located at the steerable wheel 15L in housing 21L. The opposite emitter 51L at steerable wheel 15L associated with signal conditioning means 52L directs its beam at the detectors 54R and 55R carried by the steerable wheel 15R and connected to conditioning means 56R. In that way the radiant energy beams are directed transversely of the vehicle reference 53, and are detected by the detector means lying in the path thereof.

The alignment characteristics of the vehicle wheels spaced apart longitudinally thereof in respect of the reference 53 are investigated by the instruments 23R and 24R at the right side and by instruments 23L and 24L at the left side. Thus the emitter 57L connected to conditioning means 58L directs its beam forwardly from housing 24L where it is detected by photodiodes 59L and 60L, and the signals are fed to conditioning means 61L. In like manner, the emitter 62R connected to conditioning means 63R at instrument 24R directs its radiant energy beam forwardly to instrument 23R where detectors 64R and 65R generate signals sent to conditioning means 66R. In the opposite manner, the emitter 67L and its conditioning means 68L at instrument 23L directs its beam rearwardly at the instrument 24L where detectors 69L and 70L generate signals for the conditioning means 71L. Finally, the emitter 72R and its conditioning means 73R at instrument 23R directs its beam at instrument 24R where detectors 74R and 75R generate signals for conditioning means 76R.

Figure 9:
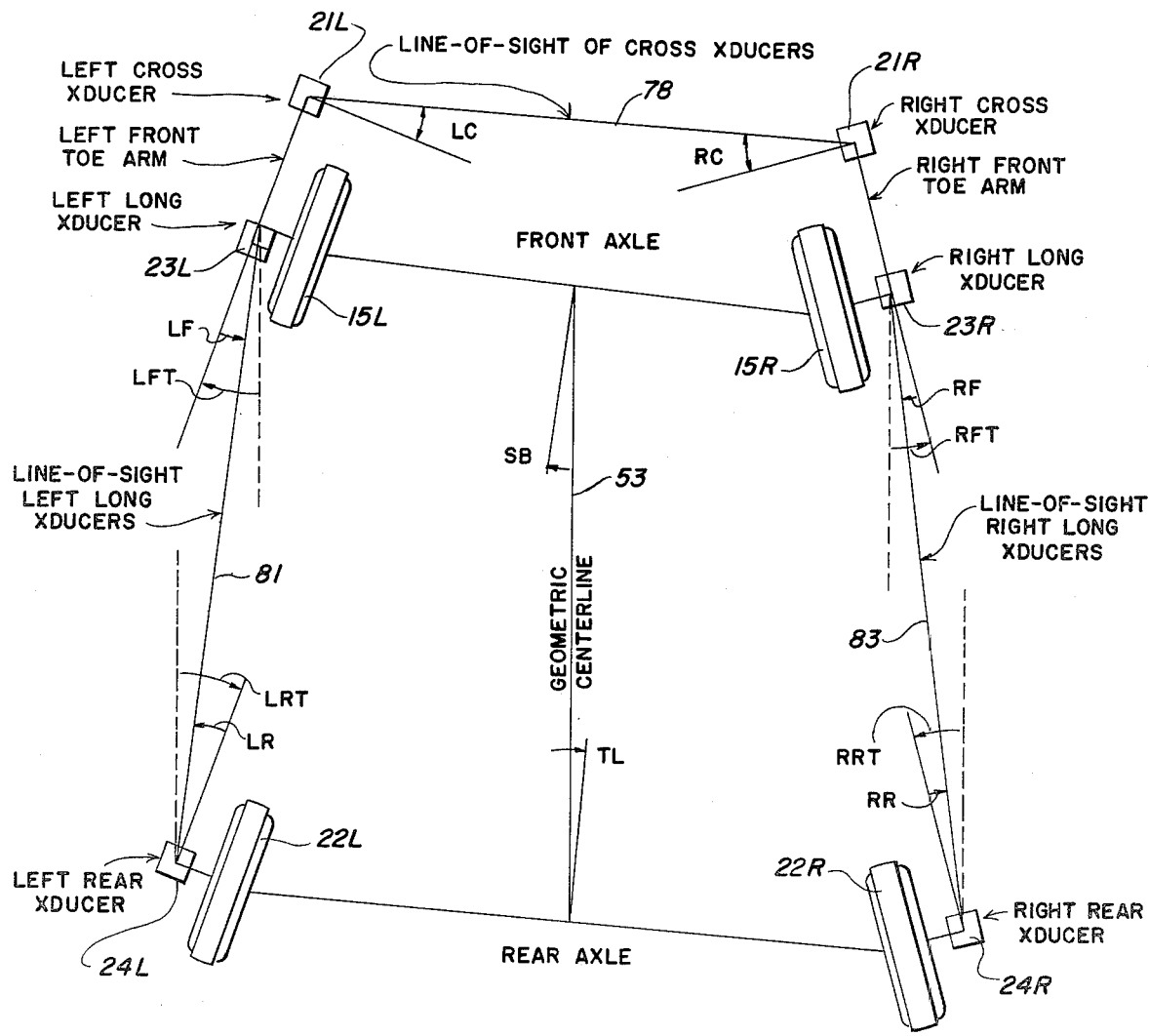
FIG. 9 is a diagrammatic plan view of the vehicle wheels in an exaggerated mis-alignment relative to a vehicle center line reference.

It can be seen in FIG. 7 that distinct signals A and B are transmitted from detector conditioning means 50L into signal computation means 77, and the computation results in a signal which has an angular value LC shown in FIG. 9 related to the transverse or cross looking line-of-sight beam path 78. The same process takes place with the signals A and B from means 56R being computed in means 79 to result in a signal having an angular value RC which is related to the line-of-sight path 78. By directing the signals A and B from means 61L into signal computing means 80, an angular value LF results which is related to the line-of-sight reference 81 seen in FIG. 9. The same procedure is followed by directing the signals A and B from the means 66R on the steerable 15R into computing means 82 so that an angular value RF is obtained in relation to the line-of-sight reference 83 in FIG. 9. In the opposite sense, the signals A and B from means 71L are fed into the computing means 84 to result in the generation of an angular value LR with reference to the line-of-sight 81. Similarly, the signals A and B from means 76R are fed into computer means 85 to result in an angular value RR relative to the line-of-sight reference 83.

In the foregoing description with respect to FIG. 7, it is to be understood that the signal values A and B from the respective signal conditioning means 50L, 56R, 61L, 66R, 71L and 76R will have values related to the angular positions of the related photodiodes with respect to the line-of-sight path of the radiant energy beam impinging thereon. In order to detect the alignment angles, the pair of detectors in each instrument are located in substantially horizontal side-by-side relation. With this orientation of the detectors, it can be appreciated from FIG. 9 that, though greatly exaggerated, the transducer instrument 21L and 21R are mounted so the photodiodes, while horizontally spaced, also are positioned in a plane parallel to the plane of wheel rotation, the assumption being that wheel run-out has been accurately compensated. The toe-in positions of the steerable wheels 15L and 15R turn the photodiodes 48L and 49L (FIG. 7) relative to the path of the beam from emitter 46R so that one detector receives more of the radiant energy than the other, consequently the signals are affected in direct proportion to the area of the detector exposed to the beam. That result applies to each of the instruments. If the vehicle wheels 15L, 15R were exactly parallel to the reference axis 53, the detectors would be substantially equally exposed to the impinging beams and the signals A and B would be substantially equal. The detectors in the instruments 23L, 23R, 24L and 24R are also horizontally spaced but the direction of the spacing is generally perpendicular to the vehicle reference line 53.

FIG. 9 is a diagrammatic view of the wheels 15L, 15R, 22L and 22R of the vehicle 14 of FIGS. 1 and 2, but in this view the wheels have been intentionally misaligned to illustrate the geometry of wheel alignment investigation using the foregoing electronic instrumentation. The instruments are generally shown and designated by the reference characters appearing in FIG. 2, and the alignment is calculated with reference to a geometric center line 53 (FIGS. 2 and 9) of the vehicle. It is necessary to understand that there is a line-of-sight 78 between the instruments 21L and 21R which represents the radiant energy beam path from the respective emitters 46R and 51L. The line-of-sight may not be the center of the beam, but the beam has a sufficient spread or fan to be seen by the opposing photodiodes. Normally the wheels will not be so far out of alignment as is depicted in FIG. 9 that the beam will not be seen. In like manner there is a line-of-sight 81 between the instruments 23L and 24L representing the radiant energy beam path from the respective emitters 57L and 67L. The line-of-sight 83 between the instruments 23R and 24R depicts the path of the radiant energy beams from the respective emitters 73R and 63R. There are construction lines on the drawing of FIG. 9 to assist in visualizing the angles to be investigated, such as the dash lines which are parallel to the geometric center line 53, and act as a reference for the angles. It is herein assumed that all measured angles have been compensated, either mechanically or electronically, for wheel run-out to eliminate from the following description need to complicate the calculations.

The angles indicated in FIG. 9 are shown in tabular form with reference to the position of the emitters and detectors used to determine those angles.

| Emitter Location | Detector Location | Measured Angle |
| --- | --- | --- |
| Right front support arm | Left front support arm | Left cross LC |
| Left front support arm | Right front support arm | Right cross RC |
| Left rear wheel | Left front wheel | Left front longitudinal LF |
| Right rear wheel | Right front wheel | Right front longitudinal RF |
| Left front wheel | Left rear wheel | Left rear longitudinal LR |
| Right front wheel | Right rear wheel | Right rear longitudinal RR |

The foregoing computations are accomplished in the respective detector signal calculators 77, 79, 80, 82, 84 and 85, and the results are fed into the alignment computer 86 where the following computations are worked out for the several angles pertinent to the alignment determination, as follows:

| The angles computed | The computation |
| --- | --- |
| LFT (left front toe) | $\frac{1}{2}$ (LC + RC + LF − RF) |
| RFT (right front toe) | $\frac{1}{2}$ (LC + RC − LF + RF) |

| The angles computed | The computation |
| --- | --- |
| TFT (total front toe) | LFT + RFT = LC + RC |
| SB (set back) | ½(RC-LC + LF-RF) |
| LRT (left rear toe) | LFT-LF + LR = ½(LC + RC-LF − RF)+LR |
| RRT (right rear toe) | RFT-RF + RR = ½(LC + RC-LF − RF)+RR |
| TRT (total rear toe) | LRT + RRT = LC + RC-LF-RF + LR + RR |
| TL (thrust line) | ½(LRT − RRT) = ½(LR − RR) |
| LFTTH (left front toe relative to thrust line) | LFT − TL |
| RFTTH (right front toe relative to thrust line) | RFT + TL |

After the computation has been made it is in a form suitable for driving the display 28. The display may be a group of meters (not shown) for showing the values of the computed angles identified in the left column above. It is usual in the make up of display 28 to provide meters and circuit selectors for connecting the meters selectively to display left, right and total toe for the steerable wheels, or left, right and total toe for the non-steerable wheels, or wheel set back, or the relationship of steerable wheel toe relative to the thrust line for the non-steerable wheels.

Vehicle wheel alignment apparatus embodying the foregoing arrangement of transducer instruments has been found to produce alignment results having a greatly improved accuracy at relatively low cost while avoiding moving parts. The apparatus is useful with respect to finding or examining the alignment of all four wheels or of less than all four wheels. As one example, the radiant energy beam may be arbitrarily located but pointed at the detector means carried by a vehicle wheel. The detectors and apertures need to be mounted on the wheel so their position represents the wheel position with respect to a vehicle reference. The signals generated by the detector must have the required relationship to the wheel position and that relationship is obtained by incorporating a windowed panel or aperture in front of the detectors, positioning the detectors on opposite sides of the center of the window and parallel to the plane of the panel. Thus the signals generated by the detectors are suitable for processing in a computer which performs the necessary calculations to convert the signals into wheel alignment information.

What is claimed is:

1. Apparatus for measuring the alignment of steerable and non-steerable vehicle wheels in relation to a vehicle reference axis and the thrust line of the non-steerable wheels to that reference axis and in which the wheels are arranged in sets spaced apart a distance representative of the vehicle wheel base, and the wheels in each set are spaced apart a distance representative of the vehicle tread width, said apparatus comprising: first support means on each of a first set of steerable wheels; second support means on each of a second set of non-steerable wheels; a pair of alignment instruments mounted on each of said first support means with first ones of each of said pair of instruments in line-of-sight with each other and with second ones of said pair of instruments in predetermined relationship with the axis of rotation of said first set of wheels and in line-of-sight with said second support means; a single alignment instrument mounted on each of said second support means in predetermined relationship with the axis of rotation of said second set of wheels and in line-of-sight with said second ones of said pair of instruments; all of said instruments having active components which include a non-directional radiant energy beam emitter, a pair of spaced apart detectors lying in a common plane, and an adjacent beam control flat mask having an aperture aligned in front of and spaced from said pair of detectors and the plane of said mask being parallel to the common plane of said pair of detectors and positioned for normally substantially equally exposing said pair of detectors; said beam control mask aperture admitting the radiant energy beam along a path from a line-of-sight instrument to said adjacent pair of detectors, whereby said pair of detectors are actively responsive in proportion to the radiant energy received thereby and generate signals proportional to the angle of the radiant energy beam in relation to the plane of said mask which represents the alignment position of the vehicle wheel upon which it is mounted, each said pair of detectors and the associated beam mask being movable with its support means so as to assume wheel alignment positions independent of the path of the radiant energy beam from the line-of-sight instrument for generating alignment information; and means connected to all of said pairs of detectors for processing the signals in terms of the alignment of the steerable wheels to the vehicle reference axis and the effect of the thrust line of the non-steerable wheels.

2. The apparatus set forth in claim 1, wherein said path for said source of radiant energy between said first ones of each of said pair of instruments is directed relative to the vehicle alignment reference axis at an angle equal to or approaching a right angle for measuring the toe alignment of the steerable wheels.

3. The apparatus set forth in claim 1, wherein said path for said source of radiant energy between said second ones of said pair of instruments and said single instruments is directed generally parallel with the vehicle alignment reference axis for measuring the thrust line of the non-steerable wheels.

* * * * *